(12) United States Patent
Masuhara et al.

(10) Patent No.: US 7,286,337 B2
(45) Date of Patent: Oct. 23, 2007

(54) SWITCHING DEVICE FOR POWER DISTRIBUTION

(75) Inventors: Hideki Masuhara, Hitachinaka (JP); Youzou Sibata, Hitachi (JP); Yasuhiro Kawamura, Hitachinaka (JP)

(73) Assignee: Hitachi Electric Systems Co., Ltd., Ibaraki (JP)

( * ) Notice: Subject to any disclaimer, the term of this patent is extended or adjusted under 35 U.S.C. 154(b) by 249 days.

(21) Appl. No.: 11/199,245

(22) Filed: Aug. 9, 2005

(65) Prior Publication Data

US 2006/0034025 A1    Feb. 16, 2006

(30) Foreign Application Priority Data

Aug. 10, 2004 (JP) ............................. 2004-233510
Jan. 20, 2005 (JP) ............................. 2005-012501

(51) Int. Cl.
*H02B 5/00* (2006.01)

(52) U.S. Cl. ........................ 361/620; 361/603
(58) Field of Classification Search ............... None
See application file for complete search history.

(56) References Cited

U.S. PATENT DOCUMENTS 4,305,114 A * 12/1981 Takagi et al. ............... 361/614
4,504,885 A * 3/1985 Yoshikawa et al. ......... 361/614
5,539,614 A * 7/1996 Ishikawa et al. ............ 361/620

FOREIGN PATENT DOCUMENTS

| JP | 03082309 A * | 4/1991 |
| JP | 7-11813 | 2/1995 |
| JP | 2003-189422 | 7/2003 |
| JP | 2003189422 A * | 7/2003 |

* cited by examiner

Primary Examiner—Boris Chervinsky
(74) Attorney, Agent, or Firm—Mattingly, Stanger, Malur & Brundidge, P.C.

(57) ABSTRACT

An object of the present invention is to provide a switching device for power distribution, wherein the entire load side-area including a circuit breaker can be protected against the grounding, whereby the protection region can be widened, leading to an enhancement in reliability. A circuit breaker, a current transformer and a zero-phase current transformer disposed in series are constructed as a unit, mounted on a carriage and accommodated in a power-receiving/distributing board. The switching unit for power distribution is constructed for connection to and for disconnection from a power source side-conductor and a load side-conductor. The zero-phase current transformer is disposed at a power source side-portion of the circuit breaker.

9 Claims, 10 Drawing Sheets

SWITCHING DEVICE FOR POWER DISTRIBUTION

BACKGROUND OF THE INVENTION

1. Field of the Invention

The present invention relates to a switching device for power distribution constructed in such a manner that a circuit breaker, a current transformer and a zero-phase current transformer are disposed in series.

2. Description of the Related Art

As well known, a switching device for power distribution is constructed in such a manner that a circuit breaker, a current transformer (a current transformer for a meter) and a zero-phase current transformer are disposed in series. A vacuum circuit breaker is used as the circuit breaker, and in usual, a surge absorber is mounted.

Such a switching device for power distribution is constructed as a unit, mounted on a carriage and accommodated in a power-receiving/distributing board. The switching device is formed so that it can be connected to and disconnected from a power source side-conductor and a load side-conductor by moving the carriage or by sliding the unit on rails. Such a switching device for power distribution is described in, for example, JP-U-07-11813 and JP-A-2003-189422.

SUMMARY OF THE INVENTION

In the prior art switching device for power distribution, a zero-phase current transformer is disposed at a load side-portion of the circuit breaker. For this reason, the prior art switching device raises such a problem that it is impossible to detect the grounding of a breaker area including the circuit breaker located at the power source side-portion of the zero-phase current transformer, resulting in a reduction in reliability.

Accordingly, it is an object of the present invention to provide a switching device for power distribution, wherein the entire load side-area including the circuit breaker can be protected against the grounding, whereby the protection region can be widened, leading to an enhancement in reliability.

To achieve the above object, according to an aspect and feature of the present invention, there is provided a switching device for power distribution, comprising a circuit breaker, a current transformer and a zero-phase current transformer, which are accommodated in a power-receiving/distributing board, the circuit breaker being constructed for connection to or disconnection from a power source side-conductor and a load side-conductor, wherein the zero-phase current transformer is disposed at a power source side-portion of the circuit breaker.

According to another aspect and feature of the present invention, there is provided a switching device for power distribution, comprising a circuit breaker, a current transformer and a zero-phase current transformer, which are constructed as a unit, mounted on a carriage and accommodated in a power-receiving/distributing board, the unit being constructed for connection to or disconnection from a power source side-conductor and a load side-conductor, wherein the zero-phase current transformer is disposed at a power source side-portion of the circuit breaker.

According to the present invention, the zero-phase current transformer is disposed at the power source side-portion of the circuit breaker. Therefore, the entire load side-area including the circuit breaker can be protected against the grounding and hence, the protection region can be widened, leading to an enhancement in reliability.

Other objects, features and advantages of the invention will become apparent from the following description of the embodiments of the invention taken in conjunction with the accompanying drawings.

DETAILED DESCRIPTION OF THE INVENTION

A switching device for power distribution is constructed in the form of a unit or units each comprising a circuit breaker, a current transformer and a zero-phase current transformer and is mounted on a carriage and accommodated in a power receiving/distributing board. The zero-phase current transformer is disposed at a power source side-portion of the circuit breaker, and the current transformer is disposed at a load side-portion of the circuit breaker. The zero-phase current transformer which may be used is a racing track-shaped zero-phase current transformer in which 3-phase power source-side terminals of the circuit breaker are surrounded by a single iron core. The unit includes a surge absorber.

Embodiment 1

Figure 1:
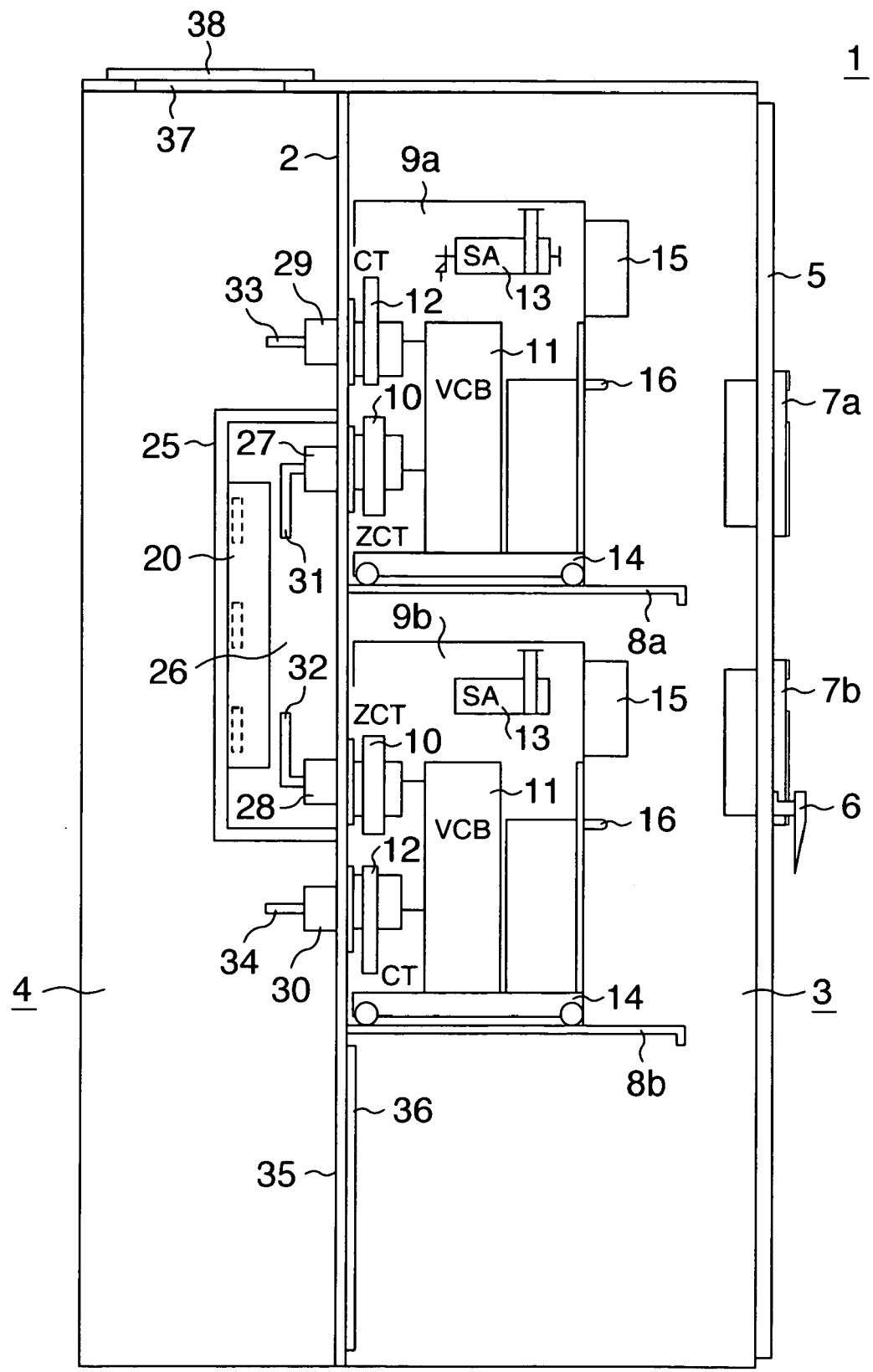
FIG. 1 is a side view of the entire arrangement of a switching device for power distribution according to one embodiment of the present invention.

FIG. 1 shows one embodiment of the present invention. FIG. 1 is a side view showing the entire arrangement of an example in which two switching units for power distribution are stacked vertically one on another.

Referring to FIG. 1, a power receiving/distributing board 1 is partitioned by a partition plate 2 into a right section and a left section as shown in FIG. 1, wherein a front surface side of the right section defines a circuit breaker chamber 3, and a back surface side of the left section defines a cable chamber 4. A door 5 having a handle 6 is mounted on a front surface of the power receiving/distributing board 1. Two grounding (over-current) protection relays 7a and 7b are mounted to the door 5.

Two support plates 8a and 8b fixed to the partition plate 2 are disposed in the circuit breaker chamber 3. The two switching units 9a and 9b for power distribution are placed on the support plates 8a and 8b. The switching unit 9 for power distribution comprises a zero-phase current transformer (ZCT) 10, a vacuum circuit breaker (VCB) 11, a current transformer 12 and a surge absorber (SA) 13 for protection from an external lightning surge. The vacuum circuit breaker (VCB) 11 is comprised of a breaking section (a vacuum valve) 11a and an operating section 11b. It should be noted that a terminal base electrically connected to the outside of the power receiving/distributing board 1 is mounted in the circuit breaker chamber 3, but not shown.

The two switching units 9a and 9b for power distribution are mounted on carriages 14, respectively. Each of the switching units 9a and 9b for power distribution has a control appliance 15 mounted to its front surface, and is provided with a handle 16 for pulling out the switching unit 9 toward the front surface (in a rightward direction as viewed in FIG. 1). Each of the switching units 9a and 9b for power distribution is fixed by a locking pin (not shown) in a state shown in FIG. 1. To pull out the unit 9 toward the front surface, the locking pin is removed, and the handle 16 is pulled.

Figure 2:
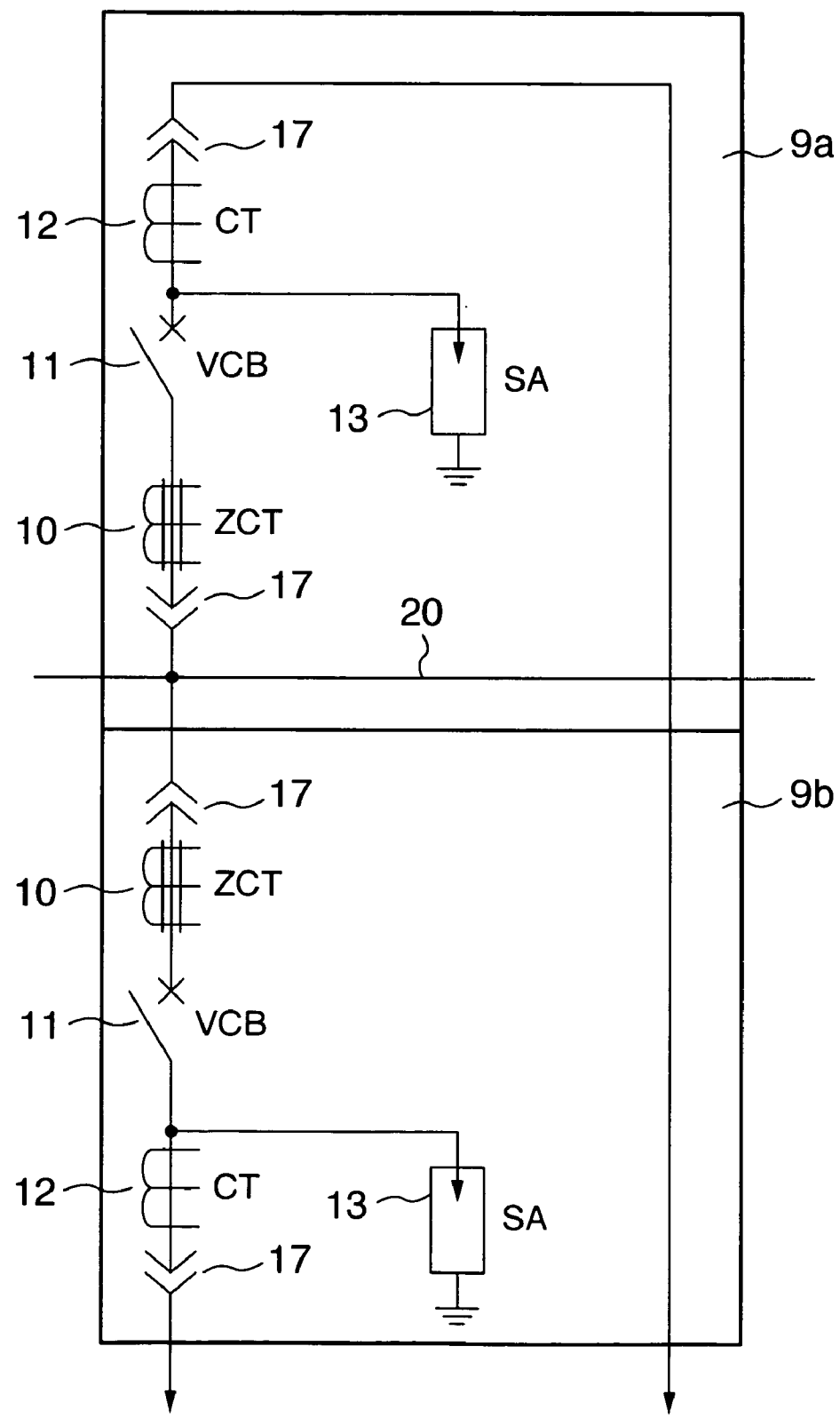
FIG. 2 is a schematic connection diagram of the switching units for power distribution according to the present invention.

The relationship of disposition of the zero-phase current transformers (ZCT) 10, the vacuum circuit breakers (VCB) 11, the current transformers 12 and the surge absorbers 13 constituting the two switching units 9a and 9b for power distribution is as shown in FIG. 2. The zero-phase current transformer (ZCT) 10, the vacuum circuit breaker (VCB) 11 and the current transformer 12 are disposed in series, and the zero-phase current transformer (ZCT) 10 is disposed at the power source side-portion of the circuit breaker 11. The current transformer 12 is disposed at the load side-portion of the circuit breaker 11, and the surge absorber 13 is connected to a load side-portion of the circuit breaker 11.

As shown in FIG. 2, the power source side-portion of the zero-phase current transformer 10 is connected to a power source-side conductor 20 through a connecting fitment 17 such as a clip, and the load side-portion of the current transformer 12 is connected to a load side-conductor through a connecting fitment 17. The zero-phase current transformer 10, the vacuum circuit-breaker 11 and the current transformer 12 disposed in series are mounted to the unit 9 and hence, when the unit 9 is pulled out, the connection between the power source-side conductor 20 and the load side-conductor is cut off.

The two switching units 9a and 9b for power distribution are stacked vertically one on another and constructed so that the positional relationship between the power side-portions and the load side-portions of the circuit-breakers 11 in the two vertically adjacent units 9a and 9b is of a vertically symmetric arrangement, as can be seen from FIG. 2. In addition, the positional relationship between the current transformers 12 and the zero-phase current transformers 10 in the two units 9a and 9b is also of a vertically symmetric arrangement.

Figure 7:
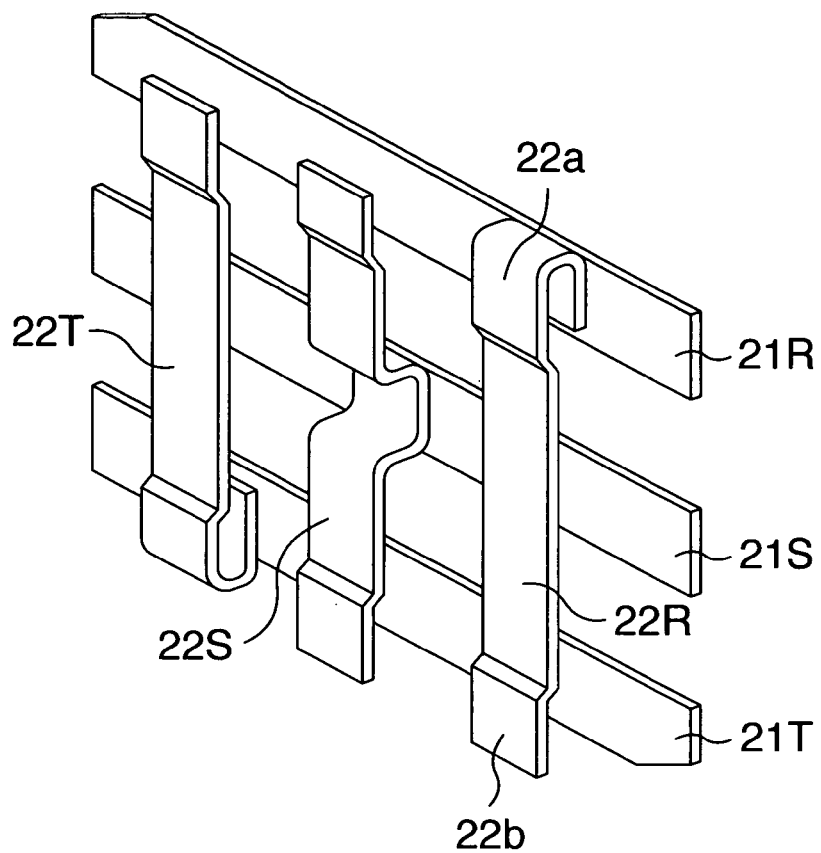
FIG. 7 is a view showing the arrangement of one example of an insulated conductor unit according to the present invention.
Figure 8:
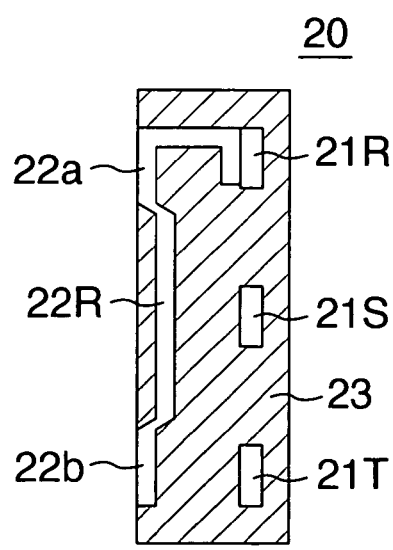
FIG. 8 is a sectional view showing the arrangement of the example of an insulated conductor unit according to the present invention.

A power source side-conductor unit 20 mold-insulated is provided in the cable chamber 4. The power source side-conductor unit 20 comprises three-phase vertical conductors 22R, 22S and 22T connected at the same phases to three-phase horizontal conductors (copper bands) 21R, 21S and 21T, as shown in FIG. 7. Each of the vertical conductors 22 has a recess formed in its central portion, as shown in FIG. 8, and is constructed so that when it is mold-insulated by a mold material 23, an upper end 22a and a lower end 22b are exposed from the mold material 23.

The power source side-conductor unit 20 is attached to a mounting member 25. The mounting member 25 is attached to the partition plate 2 formed into a rectangular shape, and has an internal space forming a conductor-treating chamber 26. Provided in the conductor-treating chamber 26 are a bushing 27 to which the zero-phase current transformer 10 of the unit 9a is connected, and a bushing 28 to which the zero-phase current transformer 10 of the unit 9b is connected. The bushings 27 and 28 are provided in a number corresponding to the three phases. It should be noted that what are actually connected to the bushings 27 and 28 are power source side-terminals of the circuit-breakers 11 constituting the units 9a and 9b.

A conductor 31 connected to the bushing 27 is connected to an exposed portion 22a at an upper end of the vertical conductor 22, and a conductor 32 connected to the bushing 28 is connected to an exposed portion 22b at a lower end of the vertical conductor 22.

Provided in a portion of the partition plate 2 on the side of the cable chamber 4 are a bushing 29 to which the current transformer 12 of the unit 9a is connected, and a bushing 30 to which the current transformer 12 of the unit 9b is connected. The bushings 29 and 30 are also provided in a number corresponding to the three phases. A load side-conductor 33 is connected to the bushing 29, and a load side-conductor 34 is connected to the bushing 30. The load side-conductors 33 and 34 are partially not shown. It should be noted that what are actually connected to the bushings 29 and 30 are load side-terminals of the circuit-breakers 11 constituting the units 9a and 9b.

An inspecting aperture (a rectangular hole) 35 on the order of 400 mm is made in a lower portion of the partition plate 2. The inspecting aperture 35 is covered with a lid plate 36 formed of a polyester resin or the like and attached to the partition plate 2 by a bolt. An inspecting aperture 37 in the form of a rectangular hole is also made in a ceiling plate of the cable chamber 4 and covered with a lid plate 38.

Figure 3:
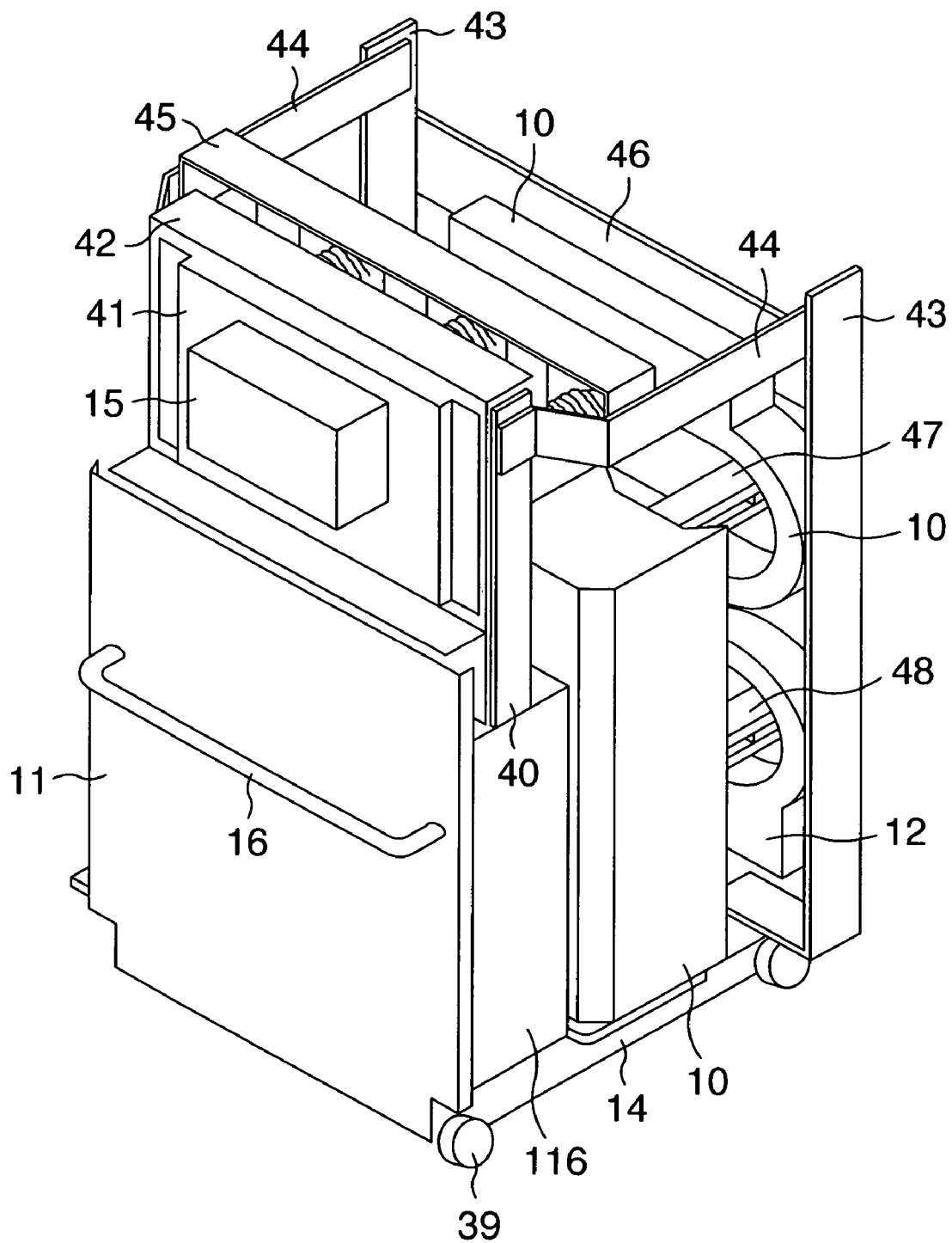
FIG. 3 is a perspective view of the switching unit for power distribution according to the present invention as viewed from a front side thereof.
Figure 4:
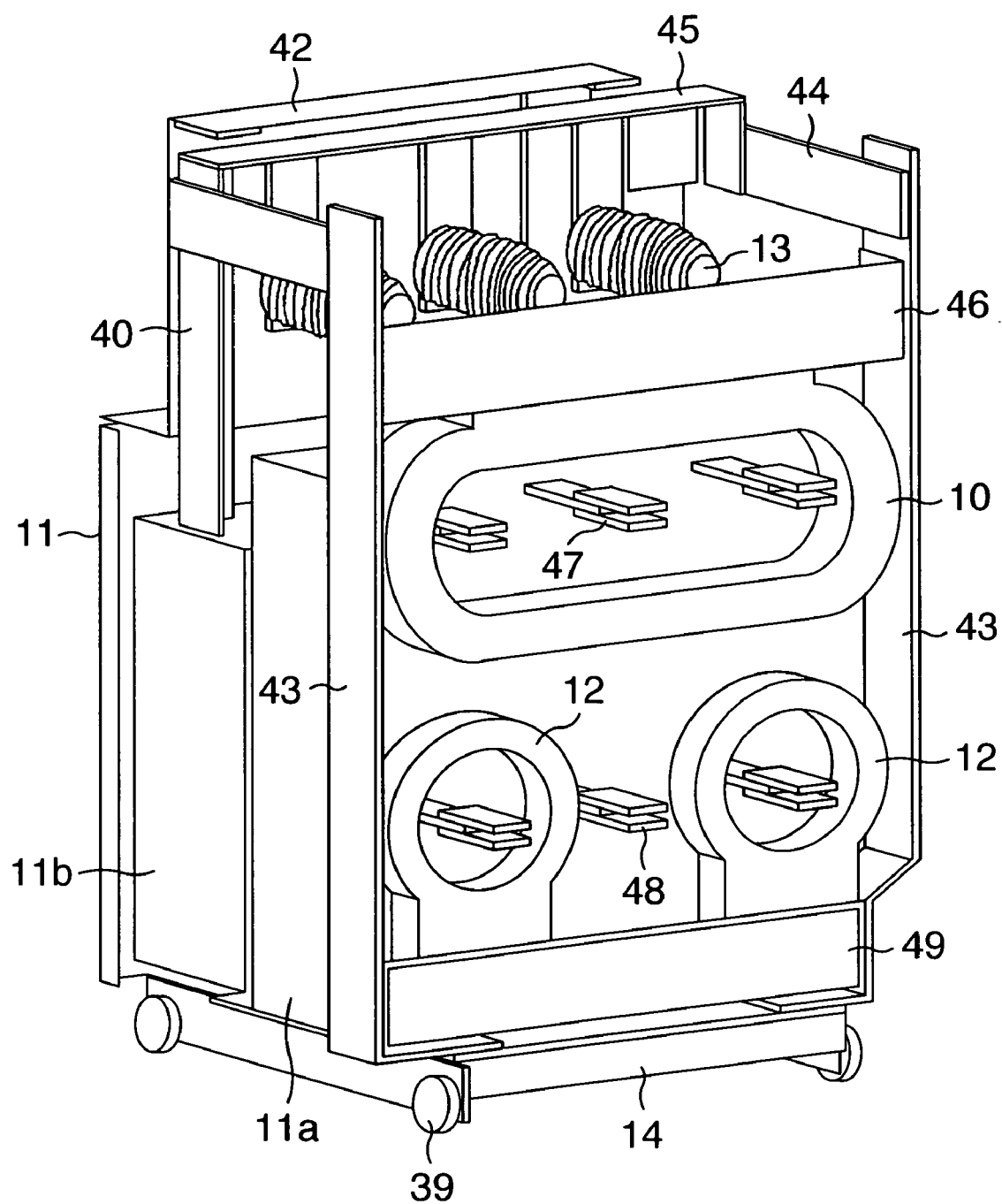
FIG. 4 is a perspective view of the switching unit for power distribution according to the present invention as viewed from a back side thereof.
Figure 5:
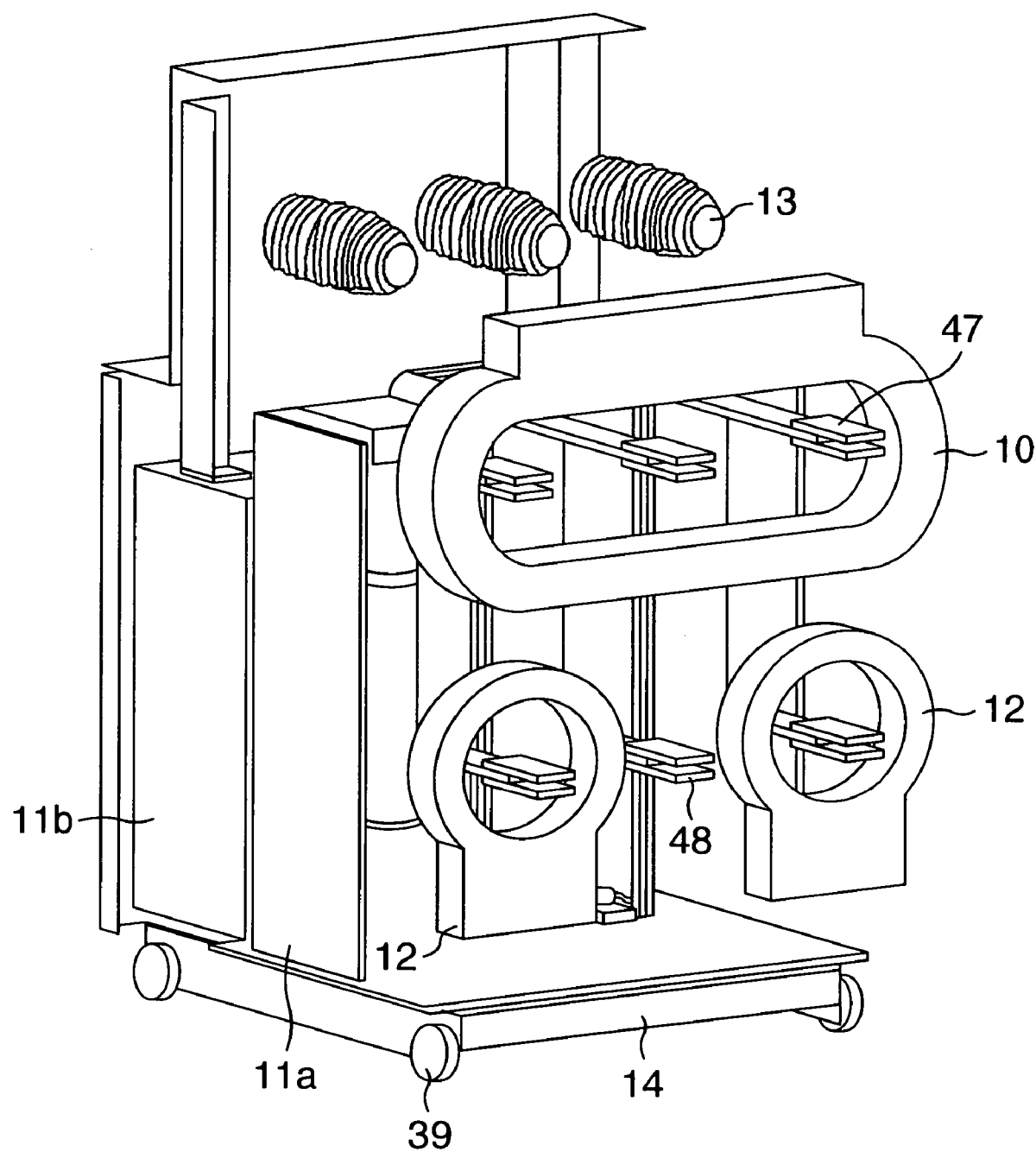
FIG. 5 is a perspective view of the switching unit for power distribution with frames removed from FIG. 4.
Figure 6:
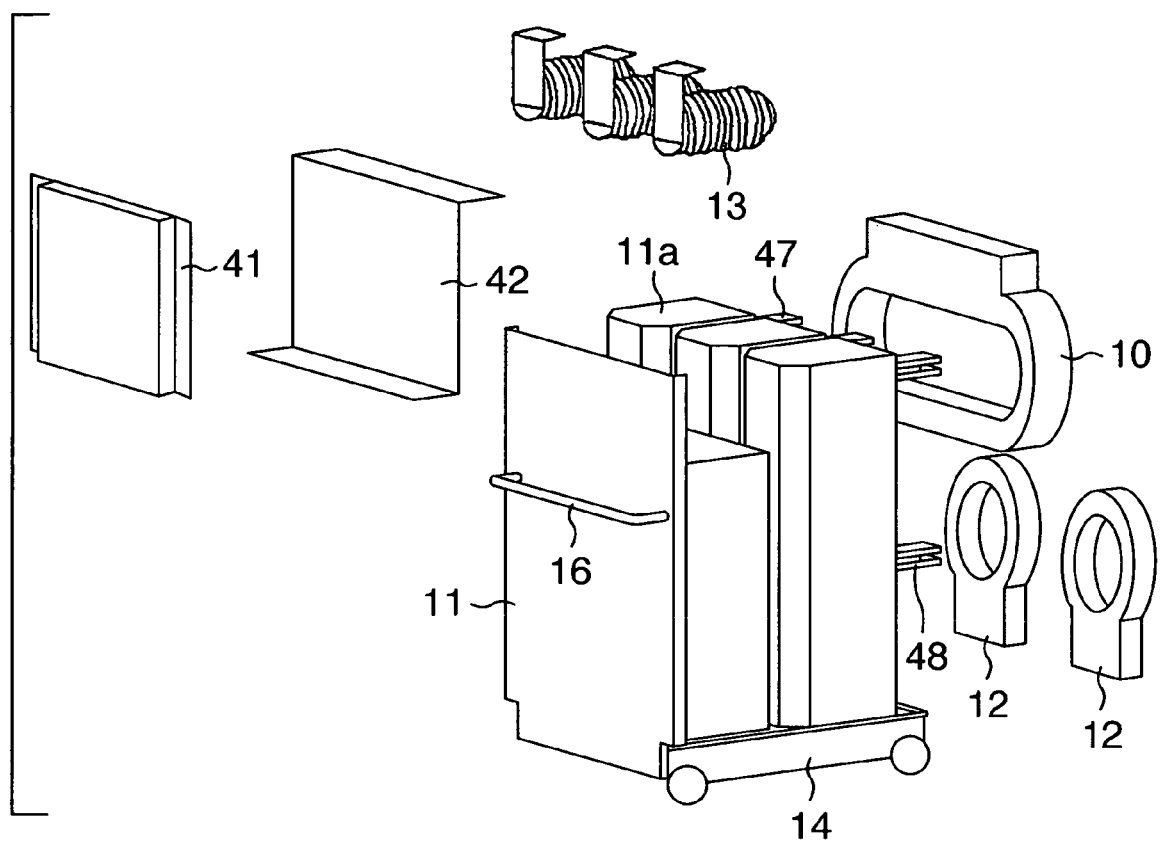
FIG. 6 is an exploded perspective view of the switching unit for power distribution according to the present invention.

The switching unit 9 for power distribution is constructed as shown in FIGS. 3 to 6. FIG. 3 is a perspective view of the unit 9 viewed from its front side; FIG. 4 is a perspective view of the unit 9 viewed from its back side; FIG. 5 is a perspective view of the unit 9 with its frame removed; and FIG. 6 is an exploded perspective view of the unit 9.

Referring to FIGS. 3 to 6, the unit 9 includes a bar-shaped handle 16 mounted to the front surface of the vacuum circuit-breaker 11. The vacuum circuit-breaker 11 includes a breaking section 11a and an operating section 11b mounted on a front portion of the carriage 14. The breaking section 11a is formed of three insulating tubes. The carriage 14 includes four casters 39.

A cover 42 is applied to vertical frames 40 fixed to opposite sides of the operating section 11b of the circuit breaker 11. The cover 42 is folded horizontally with upper and lower ends extending in opposite directions. An appliance-mounting plate 41 is secured to the vertical frames 40, and the control appliance 15 is mounted to the appliance-mounting plate 41.

Two vertical frames 43 are fixed at a rear portion of the carriage 14, and the vertical frames 40 and the vertical frames 43 are interconnected by connecting frames 44. A surge absorber-mounting fitment 45 is fixed to the connecting frames 44.

Three power source side-terminals 47 and three load side-terminals 48 are horizontally mounted to an upper portion and a lower portion of the breaking section 11a of the circuit breaker 11, respectively, as shown in FIGS. 4 and 5. A zero-phase current transformer-mounting fitment 46 is mounted at upper portions of the two vertical frames 43. The zero-phase current transformer 10 is a racing track-shaped zero-phase current transformer in which three-phase power source side-terminals 47 of the circuit breaker 11 are surrounded by a single iron core. The zero-phase current transformer 10 is attached to the zero-phase current transformer-mounting fitment 46 by bolting.

A current transformer-mounting fitment 49 is mounted at lower portions of the two vertical frames 43. The current transformers 12 are disposed at the two phases of the three phase load side-terminals 48 in the breaker 11 and attached to the mounting fitment 49. If the two vertical frames 43, the connecting frames 44 and the mounting fitments 45, 46 and 49 are removed, an arrangement of components as shown in FIG. 5 is provided, and if the components are exploded, they are shown as in FIG. 6.

The switching device for power distribution according to the present invention is constructed as described above. The circuit breaker, the current transformer and the zero-phase current transformer are accommodated in the power-receiving/distributing board; the circuit breaker is constructed for connection to and for disconnection from the power source side-conductor and the load side-conductor; and the zero-phase current transformer is disposed at the power source-side portion of the circuit breaker. Therefore, it is possible to achieve the protection of the load side-entire area including the circuit breaker against the grounding, and hence, the protection region can be widened, leading to an enhancement in reliability.

In the above-described embodiment, the circuit breaker, the current transformer and the zero-phase current transformer are constructed as the unit and hence, can be arranged compactly.

In the above-described embodiment, the zero-phase current transformer is disposed at the power source-side portion of the circuit breaker, but both of the current transformer and the zero-phase current transformer may be of course disposed at the power source-side portion of the circuit breaker. It is apparent that the zero-phase current transformer may be not of the racing track-shape, and may be elliptically or circularly shaped, and that three current transformers for meters may be disposed at the respective phases of the power source side-terminals of the circuit breaker, so that a zero-phase electric current may be detected by a three-phase resultant output.

In the above-described embodiment, the vacuum circuit breaker is shown as the example of the circuit breaker, but it is of course that any of an air circuit breaker, a hydraulic circuit breaker, a gas circuit breaker and the like may be used and even in this case, a similar effect is achieved.

Further, the power source side-conductor unit is constructed in the mold-insulated manner, but it is apparent that the unit may be constructed by a cable, by an insulated electric wire, by a Fluidized Bed Coating or by a thermally shrunk tube.

Embodiment 2

Figure 9:
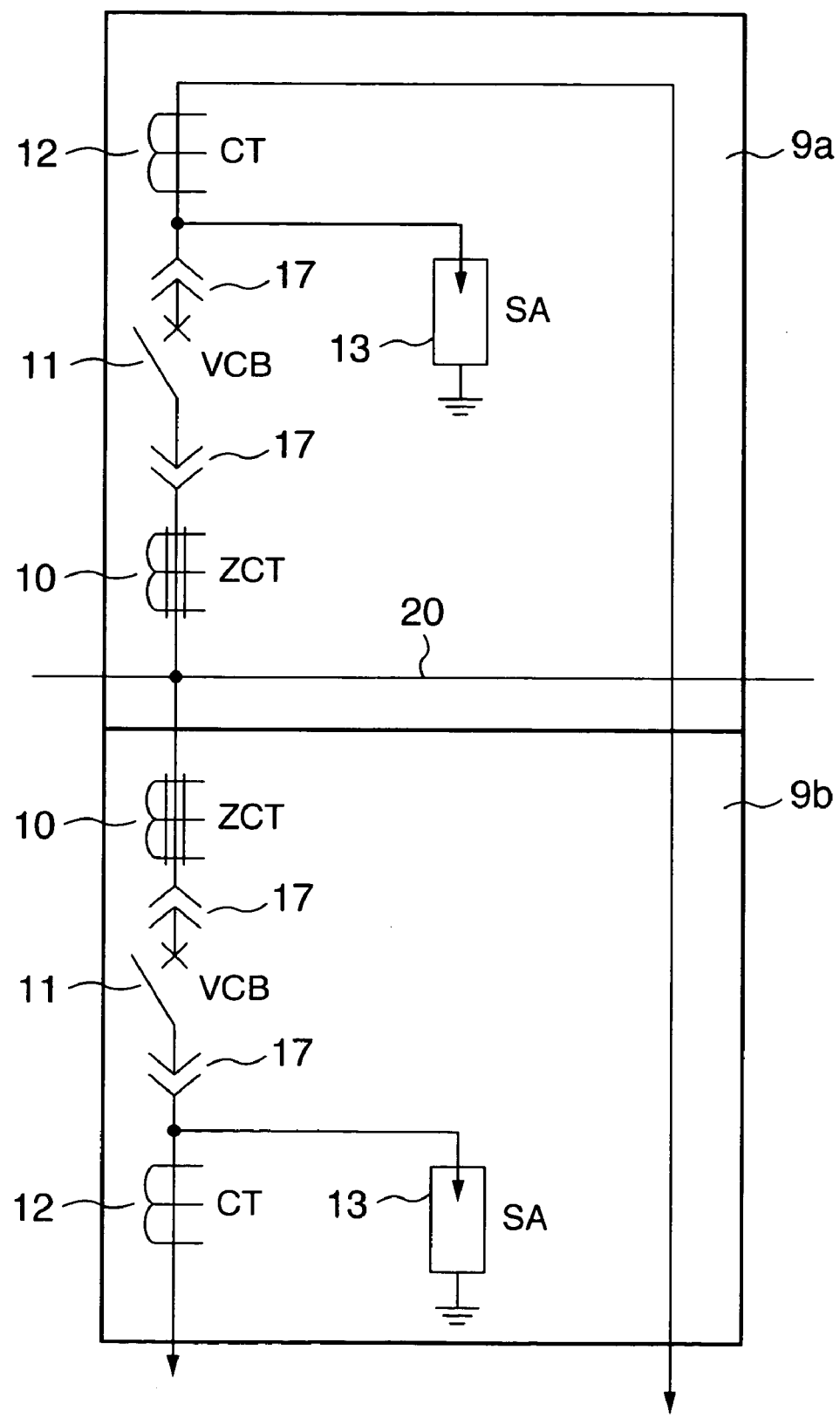
FIG. 9 is a schematic connection diagram of switching units for power distribution according to another embodiment of the present invention.

Another embodiment of the present invention is shown in FIG. 9. In the embodiment shown in FIG. 9, a zero-phase current transformer 10, a vacuum circuit breaker 11 and a current transformer 12 are shown, in a schematic connection view, as being disposed in a dispersed manner in a power receiving/distributing board 1 rather than being formed as a unit.

In FIG. 9, connecting fitments 17 are disposed at a power source side-portion and a load side-portion of the vacuum circuit breaker 11, so that only the circuit breaker 11 may be connected to and disconnected from a power source side-conductor 20 and a load side-conductor. Even if the zero-phase current transformer 10, the vacuum circuit breaker 11 and the current transformer 12 are disposed in the dispersed manner as described above, an advantageous effect similar to that in the embodiment 1 is obtained.

Embodiment 3

Figure 10:
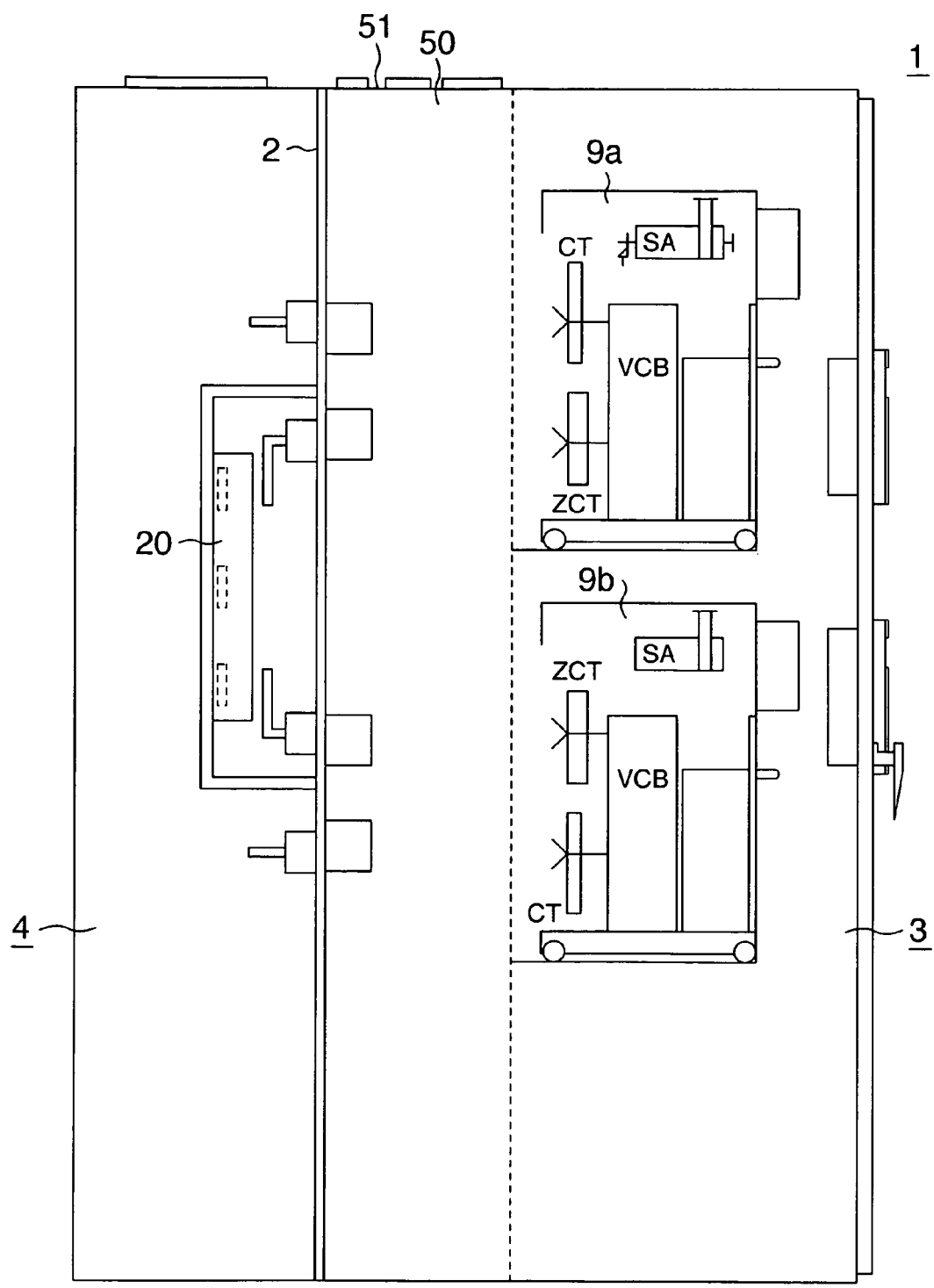
FIG. 10 is a view of the arrangement of a switching device for power distribution according to a further embodiment of the present invention.

A further embodiment of the present invention is shown in FIG. 10. In the embodiment shown in FIG. 10, a circuit breaker chamber 3 in a power receiving/distributing board 1 is formed so that it can be slid toward a front surface, thereby ensuring an inspecting space 50. The sliding of the circuit breaker chamber 3 can be achieved, for example, by a guide rail. To make access into the inspecting space 50, the circuit breaker chamber 3 is pulled out, thereby utilizing an inspecting aperture 51 formed in a ceiling plate and an inspecting aperture 35 provided in a lower portion of a partition plate 2.

Figure 11:
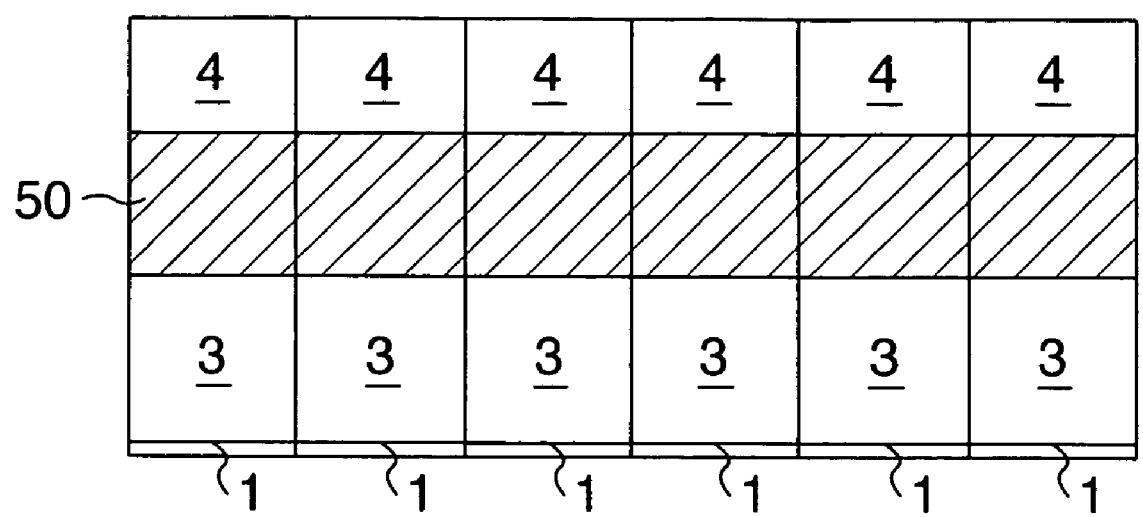
FIG. 11 is a diagram for explaining the further embodiment shown in FIG. 10.

In a case where a plurality of power receiving/distributing boards are disposed in a row arrangement, an inspecting space (an inspecting passage) 50 as shown in FIG. 11 is formed. The inspecting space 50 is formed over the entire row of the boards, but only one of the power receiving/distributing boards, which is required to be inspected, can be pulled out to form an inspecting passage 50.

In the embodiment shown in FIG. 10, when the inspection of the power receiving/distributing board is required, the necessary inspecting space can be ensured within the power receiving/distributing board and hence, inspecting spaces on the back and side of the power receiving/distributing board are not required. Therefore, the power receiving/distributing board can be installed with its back and side placed closer to a wall surface of a building or the like, leading to an effect of a reduction in installing area. This is effective particularly when a plurality of power receiving/distributing boards are arranged in a row.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A switching device for power distribution, comprising a circuit breaker, a current transformer and a zero-phase current transformer, which are accommodated in a power-receiving/distributing board, said circuit breaker being constructed for connection to and for disconnection from a power source side-conductor and a load side-conductor, wherein said zero-phase current transformer is disposed at a power source side-portion of said circuit breaker.

2. A switching device for power distribution, comprising a circuit breaker, a current transformer and a zero-phase current transformer, which are constructed as a unit, mounted on a carriage and accommodated in a power-receiving/distributing board, said unit being constructed for connection to and for disconnection from a power source side-conductor and a load side-conductor, wherein said zero-phase current transformer is disposed at a power source side-portion of the circuit breaker.

3. A switching device for power distribution according to claim 1, wherein said current transformer is disposed at a load side-portion of said circuit breaker.

4. A switching device for power distribution according to claim 1, wherein said zero-phase current transformer is a racing track-shaped current transformer in which three-phase power source side-terminals of said circuit breaker are surrounded by a single iron core.

5. A switching device for power distribution according to claim 1, wherein said current transformer is disposed at a two-phase load side-terminal of three-phase load side-terminals of said circuit breaker.

6. A switching device for power distribution according to claim 1, further including surge absorber.

7. A switching device for power distribution according to claim 1, wherein said circuit breaker is a vacuum circuit breaker.

8. A switching device for power distribution according to claim 1, wherein said power source side-conductor comprises a combination of horizontal conductors and vertical conductors in an insulated manner to form an insulated conductor unit.

9. A switching device for power distribution according to claim 2, wherein a plurality of said units are stacked vertically one on another so as to make the positional relationship between the power source side-portions of the load side-portions of the circuit breakers in the two vertically adjacent units a vertically symmetric arrangement, and to make the positional relationship between said current transformers and the zero-phase current transformers a vertically symmetric arrangement.

* * * * *